United States Patent
Vajo et al.

(10) Patent No.: US 6,537,379 B1
(45) Date of Patent: Mar. 25, 2003

(54) PHOTOCATALYTIC COATING AND METHOD FOR CLEANING SPACECRAFT SURFACES

(75) Inventors: John J. Vajo, West Hills, CA (US); Weldon S. Williamson, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/482,662

(22) Filed: Jan. 13, 2000

(51) Int. Cl.$^7$ .................. C23C 14/34; C23C 16/00; C23G 1/00
(52) U.S. Cl. ............... 134/2; 134/1; 134/1.1; 204/192.15; 204/192.16; 427/126.3; 427/164; 427/165; 427/585
(58) Field of Search ............... 134/1, 1.1, 2; 204/192.15, 204/192.16, 192.3, 192.32; 427/126.3, 164, 165, 585

(56) References Cited

U.S. PATENT DOCUMENTS

| | | | |
|---|---|---|---|
| 4,836,860 A | | 6/1989 | Bianchi .................. 134/21 |
| 4,846,425 A | * | 7/1989 | Champetier ............... 134/1 |
| 4,977,352 A | | 12/1990 | Williamson ............ 315/111.81 |
| 5,008,148 A | * | 4/1991 | Thurm et al. ............... 428/336 |
| 5,043,049 A | * | 8/1991 | Takenaka ............... 204/192.15 |
| 5,418,431 A | | 5/1995 | Williamson et al. .... 315/111.51 |
| 5,628,831 A | | 5/1997 | Williamson et al. ......... 134/1.1 |
| 5,928,461 A | | 7/1999 | Kaufman et al. ............ 156/345 |
| 6,013,372 A | * | 1/2000 | Hayakawa et al. ....... 428/411.1 |

FOREIGN PATENT DOCUMENTS

| | | |
|---|---|---|
| EP | 0 816 466 A1 | 1/1998 |
| WO | 96/37280 | 11/1996 |

OTHER PUBLICATIONS

Dagani, R., "Architectural Tour of the Nano World," *Chemical and Engineering News*, (Sep. 1998), pp. 70–71, 74, 76, 77.

Wang, R., et al., "Light–induced Amphiphilic Surfaces," *Nature*, vol. 388 (Jul. 1997), pp. 431–432.

\* cited by examiner

*Primary Examiner*—Rodney G. McDonald
(74) *Attorney, Agent, or Firm*—Ladas & Parry

(57) ABSTRACT

A photocatalytic coating based on titanium dioxide, and certain titanates is applied to the critical external optical spacecraft surfaces to be protected from contamination with polymerized hydrocarbon films. The thickness of the coating is within the range of 5 Angstrom to $2 \times 10^4$ Angstrom and it can be applied using a variety of methods, such as sputtering, electron beam evaporation, or sol-gel processing. A method for cleaning the spacecraft surfaces initiated by a reaction of the coating with a UV-photon, followed by oxidation of the hydrocarbons adsorbed on the protected surfaces thus preventing their polymerization on the surfaces and causing their safe evaporation and dissipation into the environment. At orbital altitudes a stream of $H_2O_2$ or oxygen is directed at the surface, possibly continuously, and preferably, periodically, regenerating the original form of titanium in the photocatalytic coating and re-starting the cleaning cycle. The surfaces at orbital altitudes are cleaned by a combined action of the coating and oxygen.

47 Claims, 2 Drawing Sheets

FIG. 2

$$Ti^{4+} + H_2O + a\ UV\ photon \quad (7)$$

$$\downarrow$$

$$Ti^{3+} + OH\cdot + O\cdot \quad (8)$$

$$\downarrow$$

$$+ hydrocarbons$$

$$\downarrow$$

$$CO_2 + CO + H_2O \quad (9)$$

$$Desorption\ and\ dissipation \quad (10)$$

$$\downarrow$$

$$Ti^{3+} + H_2O_2\ (or\ O_2) \longrightarrow Ti^{4+} \quad (11)$$

PHOTOCATALYTIC COATING AND METHOD FOR CLEANING SPACECRAFT SURFACES

I. BACKGROUND OF THE INVENTION

1. Field of the Invention.

This invention relates to the field of the preventing excessive accumulation of polymerized hydrocarbon and/or hydrocarbon-silicone films on critical external optical spacecraft surfaces and of cleaning the surfaces from such polymerized films which do accumulate on these surfaces. More particularly, it pertains to the use of photocatalytic coatings, such as titanium dioxide ($TiO_2$), to oxidize the hydrocarbons and to prevent the accumulation of the polymerized films on the protected surfaces.

2. Description of the Related Art.

In space, external optical surfaces such as those of imaging optics, thermal radiators, solar panels, cryogenic infrared optics, warm visible-light and ultra-violet light optics, on spacecraft in orbits become contaminated as a result of polymerization of hydrocarbons adsorbed on those surfaces. These hydrocarbons are present in vapors that outgas from onboard organic materials such as bonding agents, foams, conformal coatings on circuit boards, potting compounds and the like. After being adsorbed on optical surfaces, these organic materials polymerize, at least on the sun-illuminated surfaces, followed by cross-linking under the harsh conditions of UV exposure. As a result, high molecular weight polymers are formed on the optical surfaces. They form a yellowish deposit that darkens with time.

Such contamination in space is harmful to the smooth operation of a spacecraft and poses a serious technical problem. The functions of thermal radiators and of solar panels are substantially impaired and compromised as a result. The solar panels become seriously degraded with time as the thickness of the polymer films increases and less and less sunlight penetrates to the photovoltaic junctions. The thermal radiators lose their cooling effectiveness because they absorb more and more sunlight and convert it into heat as the films thicken. In addition, reflective or Fresnel-lens solar concentrators, anticipated for use on near-future spacecraft, will also darken and transmit less and less sunlight to the solar panels as the photopolymerized films accumulate. If nothing is done, the on-board electronics will either have to be shut off to avoid overheating or will be shut off because there will be not enough electricity generated.

To neutralize the problem of the polymeric film growth on the critical optical surfaces, the thermal radiators and solar panels should have an overcapacity (and usually it means they must be oversized), and/or deployable radiators must be used (the radiators are mechanically deployed after the original surfaces have become contaminated), or an active cleaning system must be provided. The use of both oversized radiators and/or of deployable radiators adds weight, cost and complexity to the spacecraft. In addition, the use of oversized radiators would require consumption of precious electrical power to heat the spacecraft early in its life, before the films have built up. With the deployment systems there is always an added risk of their failure after years in space. Therefore, the development of a cleaning system remains the most attractive alternative.

A known method of active cleaning of the optical surfaces is a method of plasma cleaning. U.S. Pat. Nos. 5,928,461, 5,628,831, 5,418,431, and 4,977,352 describe this plasma cleaning method which is believed to be a current state-of-the-art of active cleaning methods. This plasma system involves the use of a radio-frequency plasma source to form a plasma of a reactant gas (water) that floods the surfaces to be cleaned. The plasma contains reactive species, i.e., excited neutrals, ions, free radicals, that break the polymeric films into low molecular weight neutral substances that quickly desorb at typical spacecraft temperatures. This method, however, has serious disadvantages. It requires a plasma source, a radio-frequency power supply, control electronics, and reservoir of reactant. All of this makes the spacecraft more expensive, heavier and more complex. There is also a increased need for power to run the radio-frequency power source. For all these technical and economic reasons, this cleaning system is not believed to have been used on an actual spacecraft.

A method for self-cleaning of windshields and bathroom tiles using titanium dioxide-based coatings for photocatalytic oxidation of hydrocarbons has been described in a printed publication. Chemical & Engineering News, Sep. 21, 1998, Pages 70–74. However, it is believed that the method has never been proposed for space applications. There exists no fielded system for cleaning optical surfaces in orbit. Yet, as discussed above, the need for such system is acute.

For the foregoing reasons, there is a necessity for an active system for cleaning crucial optical surfaces of spacecraft in orbit. The system needs to be reliable, effective and must be low in cost.

II. SUMMARY OF THE INVENTION

The present invention is directed to a composition that satisfies the need for a reliable, effective and low cost system that will help ensure that an excessive accumulation of polymerized hydrocarbon and/or hydrocarbon-silicone films on crucial optical surfaces of spacecraft will not occur. It is further directed to the cleaning method that will ensure that even if some polymeric film build up does take place, the surfaces can be easily cleaned while the spacecraft is in its orbit. Alternatively, the present invention would allow cleaning of surfaces of aircraft of similar contamination. As another alternative, bodies of automobiles and windows of buildings can also be coated thus helping to reduce urban hydrocarbon pollution.

A coating in accordance with this invention is applied to the surfaces to be protected. Materials for the coating comprise titanium dioxide (along or being doped with metals like copper or silver), and titanates. The thickness of the coating is preferably within the range of 5 Angstrom to $2 \times 10^4$ Angstrom and it can be applied using a variety of methods including sputtering, electron beam evaporation, and sol-gel processing.

The gist of a cleaning method in this invention is that the coating catalyzes reaction between the hydrocarbons and oxygen, thus preventing their polymerization on the surfaces and causing their safe evaporation and dissipation into the environment. This can occur without human participation and without expensive mechanical or electrical devices to help the system function. As such, the system can be completely passive and, in the presence of an oxidizing agent, self-cleaning can occur. At orbital altitudes above low-earth orbits (LEO) there is little or no oxygen normally available outside the space craft, so a stream of an oxidizing agent, including, but not limited to, $H_2O_2$ or oxygen, is released and directed at the surface, either continuously or periodically. The surfaces at such orbital altitudes are cleaned by a combined action of the coating, the oxidizing agent, and solar UV-light. At LEO altitudes and for spacecraft in Molniya orbits, surfaces that face into the ram direction (usually East) will be self-cleaning due to the oxygen available in the atmosphere; wakeside surfaces may require supplemental oxidizing agent for effective cleaning.

In the case of solar panels and solar concentrators, solar UV is present at all times except during spacecraft eclipse, so cleaning can occur almost all the time, if needed. Radiator panels are commonly fitted to geostationary spacecraft with one panel facing north, and the other facing south. Because of the seasonal motion of the sun, the north radiator will be sunlit only between the vernal and autumbral equinoxes, while the south radiator will be sunlit only during the other half of the year. Since cleaning can only take place in the presence of solar illumination, a useful cleaning strategy may be to clean each radiator just before it passes into darkness. This will keep the radiator clean during its half-year of darkness, since photopolymerization does not occur without sunlight.

III. BRIEF DESCRIPTION OF THE DRAWINGS

The features and advantages of the present invention will become better understood with regard to the following description, appended claims, and accompanying drawings where:

FIG. 2 is a schematic diagram showing the stages of the cleaning cycle.

IV. DETAILED DESCRIPTION OF THE INVENTION

1. A Preferred Embodiment

Figure 1:
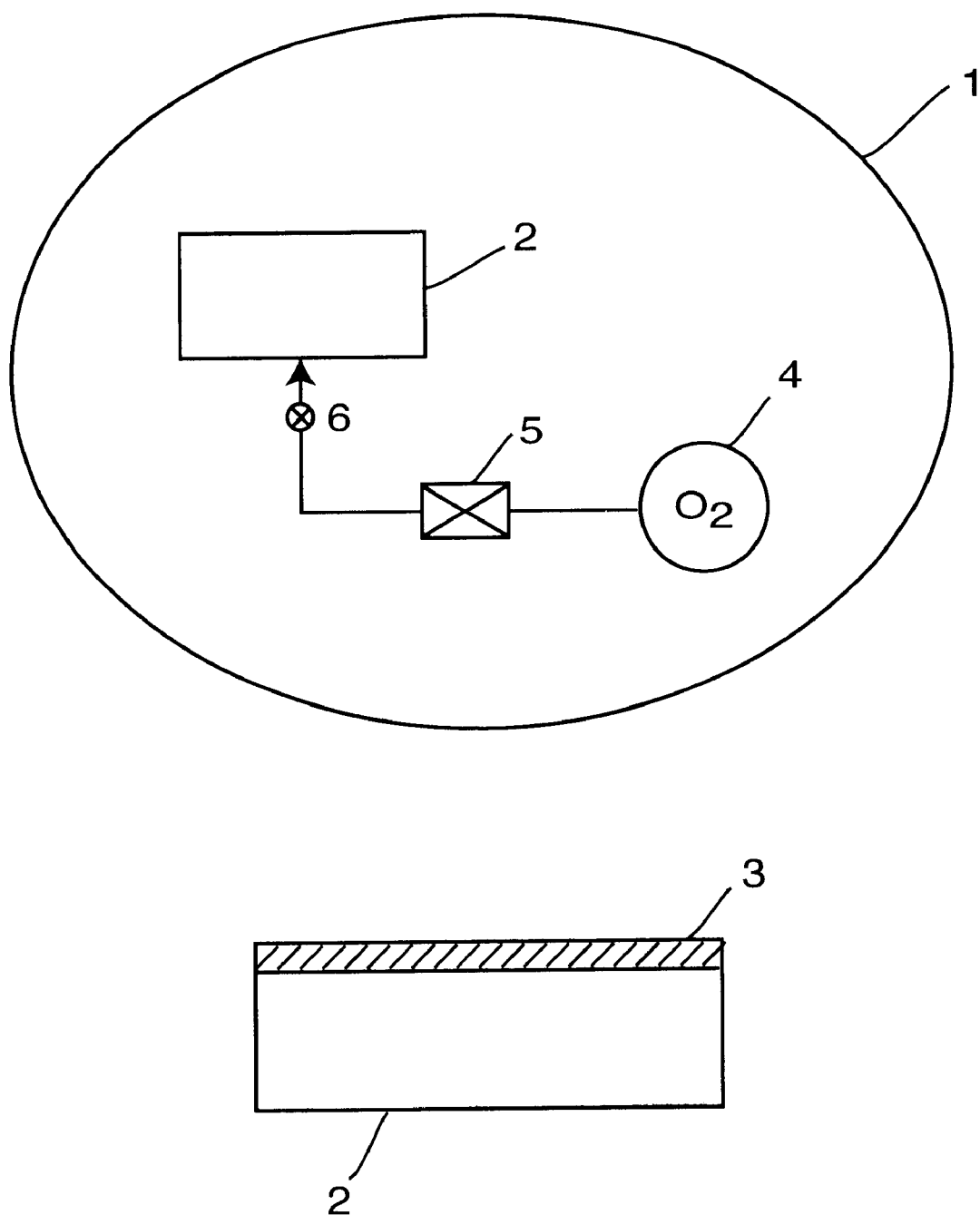
FIG. 1 is a schematic diagram showing the external optical spacecraft surfaces to be protected and the location of the claimed coating and of the location of the oxygen source.

External optical spacecraft (1) surfaces (2), preferably, thermal radiators and solar panels, are treated with titanium dioxide (titania $TiO_2$), or, preferably, with copper (Cu) - doped titania or silver (Ag)-doped titania, to form a layer (3) of $TiO_2$ or $TiO_2/Cu$, or $TiO_2/Ag$ thereon. The other acceptable choices of a photocatalytic coating materials are titanates of certain metals, including, but not limited to, barium, strontium, and lead. The choice of Cu-doped or Ag-doped titania is a preferred embodiment because electrostatic charging of the surfaces at orbital altitudes will be avoided.

The coating is applied by any of a number of methods, comprising a sputtering method (such as reactive sputtering of the metal constituents in the presence of oxygen or radio frequency sputtering of stoichimetric targets), the electron beam evaporation method, or the method of sol-gel processing. The thickness of the coating so applied is within a range of 5 Angstrom to $2 \times 10^4$ Angstrom.

One possible mechanism shown on FIG. 2 is (the initial stage of the process marked 7) that in the presence of UV radiation in space a $Ti^{4+}$ cation of $TiO_2$ absorbs a UV-photon (UV photons are known to exist in sufficient quantities at both sea level and satellite altitudes) and is reduced to a $Ti^{3+}$ cation as a result of such absorption. Due to the presence of ambient water vapor and other hydrogen and oxygen-containing substances, oxygen and hydroxyl radicals $O^-$ and $OH^-$ are generated as another result of $Ti^{4+}$ to $Ti^{3+}$ reduction.

$O^-$ and $OH^-$ radicals are very aggressive and immediately attack the hydrocarbons which are present in outgassing of onboard organic materials and which are about to start adsorbing, or already partially adsorbed, on the surfaces to be protected (stage 8). The hydrocarbons will be oxidized to carbon monooxide (CO), carbon dioxide ($CO_2$) and water ($H_2O$) (stage 9). These products will immediately desorb and dissipate (stage 10), as will short-chained highly volatile hydrocarbons which also may form as a by-product, leaving a clean, partially reduced surface.

Of course, it leaves titanium in the $Ti^{3+}$ form, unable to participate in this process. It must, therefore, be converted back into the active $Ti^{4+}$ form. This regeneration of the active $Ti^{4+}$ form is achieved by oxidation of $Ti^+$ (stage 11) with an oxidizing agent, including, but not limited to, preferably, hydrogen peroxide ($H_2O_2$), or, oxygen or even perhaps water vapor, to form the active $Ti^{4+}$ structures, such as Ti=O, Ti—O—Ti, or Ti—OH, on the surface to be protected. Titanium in such forms is active and starts the whole cycle again with the absorption of a UV-photon (stage 7).

It follows from the foregoing that an active oxidizing agent such as hydrogen peroxide or oxygen is necessary for the whole process to work as they are the oxidizing agents which convert an inactive $Ti^{3+}$ into active $Ti^{4+}$. For terrestrial applications and for LEOs, the amount of the ambient molecular or atomic oxygen is sufficient to maintain the $Ti^{3+}$ into $Ti^{4+}$ conversion process.

In space a source of the oxidizing agent ($H_2O_2$ or oxygen) (4) (FIG. 1) is necessary, as well as a valve (5) (FIG. 1) and jets (6) (FIG. 1) to shape the stream of $H_2O_2$ or oxygen to be directed at the surfaces to be cleaned. These components (4, 5 and 6) (FIG. 1) are already in common use on spacecraft making costly component-qualification program of new parts unnecessary.

The stream of the oxidizing agent released through the valve (5) and the jets (6) covers the surface, oxidizes $Ti^{3+}$ into $Ti^{4+}$, and thus maintains the cleaning cycle. $H_2O_2$ or oxygen can be continuously leaked for the life of the spacecraft in which case no control will be needed and the cleaning system will be automatic and self-sustaining. However, the outgassing of spacecraft also contains substantial quantities of silicones. If continuous cleaning is used, these silicones will oxidize to form silicates and polymeric forms of silicates which could remain on the surface as a growing contaminant layer of film. However, experience with plasma cleaning methods showed that periodic, high-rate cleaning removed the silicones along with the polymerized hydrocarbons. Contrariwise, experience with long duration exposure facility showed that low-rate, continuous cleaning with ambient atomic oxygen led to a buildup of silicates.

It is, therefore, the preferred embodiment of the present invention, that $H_2O_2$ or oxygen be released periodically and slowly. The preferred amount of the oxidizing agent to be released is comparable with the amount of water used in the plasma cleaning method of the prior art and is about 0.2 kg per radiator, solar concentrator, or solar panel, as the case may be. Such periodic release has all advantages of the continuous cleaning in terms of protection the surfaces from the polymerized hydrocarbon contamination while simultaneously avoiding the formation of the silicate or polymerized silicate films as well.

2. An Alternative Embodiment

Alternatively, surfaces other than the solar panels or the thermal radiators, can be also cleaned from contaminants by this method. These surfaces comprise those of imaging optics (including cryogenic infra-red optics, and warm visible-light and ultra-violet optics) such as telescopes, spectrometers, coronagraphs, star-trackers, and the like, that are commonly found on military and scientific spacecraft.

(A) Cryogenic Infra-Red (IR) Optics.

An example of the cryogenic (IR) optics are the reflecting telescopes that are commonly used to detect spacecraft such as nuclear-weapon reentry vehicles in the boost phase. These instruments employ cryogenic optics operating at temperatures of 50 to 100 Kelvins (−223° C. to −173° C. or −142° F. to −114° F.). While the optics are not subject to photopolymerization since they are not exposed to sunlight, hydrocarbon vapors do condense on their cold surfaces. Eventually these layers become thick enough to absorb incident light, reducing the sensitivity of the instrument. In addition, the contaminant layers are generally not smooth, because internal stresses cause them to develop cracks and other defects.

These defects scatter stray light, such as that from the Earth's limb, onto the focal-plane array, further degrading the already marginal signal-to-noise ratio and ultimately obscuring the target from detection.

The optical surfaces are coated with very thin layers of titania or the other photocatalytic materials discussed above, without significantly absorbing the IR light of interest. By illuminating these surfaces with an onboard UV lamp (not shown on FIG. 1 or 2) and simultaneously directing a jet of a non-cryocondensible oxidant, for example, oxygen onto the surface, the contaminant hydrocarbons are oxidized into more volatile species, cleaning the surfaces as discussed above. The lamp and oxygen nozzle are mounted in the cryobaffles that line the tube walls of this type of instrument.

(B) Warm (Visible-Light) Optics.

Warm imaging optics such as visible-light telescopes will typically not condense and polymerize hydrocarbons unless they are exposed to sunlight. However, it is known that these optical surfaces become contaminated by particles that originate from sources such as the paints and thermal blankets that cover many exterior surfaces of spacecraft. As they drift away from the spacecraft, particles become positively charged due to photo-emission, and they are attracted back to non-sunlit surfaces, which are often negatively charged due to the action of the space plasma. These particles are mostly hydrocarbons (paint binders and Kapton fragments) and will be effectively cleaned by the photocatalytic process discussed above. The UV illumination is provided either by providing a UV lamp, or by temporarily pointing the instrument so that its optics are sunlit.

(C) Warm (UV) Optics.

UV instruments such as coronagraphs and spectrometers experience severe photopolymerization of hydrocarbons and consequent attenuation of the light because they concentrate the sunlight. A very thin coating of titania or other photocatalyst, as discussed above, is applied on these instruments and the instruments are kept contaminant free by providing a jet of a suitable oxidant, as discussed above.

We claim:

1. A method for preventing an excessive accumulation of polymerized hydrocarbon and/or a silicone film on a surface, wherein a photocatalytic coating is deposited on the surface, wherein the photocatalytic coating comprises a compound selected from the group consisting of:
   (A) titanium dioxide;
   (B) titanium dioxide doped with a metal selected from the group consisting of copper and silver; and
   (C) a titanate having a formula Me—$TiO_3$, wherein Me is a metal selected from the group consisting of barium, strontium, and lead;

wherein the surface is an external surface of a spacecraft in space; and
   wherein the method comprises the steps of:
   (a) providing on the spacecraft a source of an oxidizing agent, wherein the oxidizing agent comprises hydrogen peroxide or $O_2$;
   (b) releasing a stream of the oxidizing agent through a jet means to produce a jet of the oxidizing agent; and
   (c) directing the jet of the oxidizing agent onto the external surface of the spacecraft in space to oxidize the photocatalytic coating.

2. The method as claimed in claim 1, wherein said coating has a thickness when applied to said surface, wherein the thickness is within a range of between 5 Angstroms and $2 \times 10^4$ Angstroms.

3. The method as claimed in claim 2, wherein said surface comprises one or more thermal radiators, solar panels, solar concentrators, and/or imaging optics, said imaging optics further comprising cryogenic infra-red optics, visible-light optics, and/or ultra-violet optics.

4. The method as claimed in claim 2, wherein said coating is deposited onto said surface by reactive sputtering of metal constituents in the presence of oxygen.

5. The method as claimed in claim 2, wherein said coating is deposited onto said surface by radio frequency sputtering of stoichiometric targets.

6. The method as claimed in claim 2, wherein said coating is applied to said surface by electron beam evaporation.

7. The method as claimed in claim 2, wherein said coating is deposited onto said surface by sol-gel processing.

8. A method as claimed in claim 2, wherein the oxidizing agent is $O_2$.

9. The method as claimed in claim 1, wherein said coating has a thickness when applied to said surface; wherein the thickness is within a range of between 5 Angstroms and $2 \times 10^4$ Angstroms; and wherein said surface is cleaned by a combined action of said photocatalytic coating and said oxidizing agent while said spacecraft is in orbit.

10. The method as claimed in claim 9, wherein said oxidizing agent is applied by a method of periodic dispensing.

11. The method as claimed in claim 9, wherein said releasing of said oxidizing agent is by a method of continuous leaking.

12. A method as claimed in claim 9, wherein the oxidizing agent is $O_2$.

13. A method as claimed in claim 1, wherein the oxidizing agent is $O_2$.

14. A method as claimed in claim 1, wherein the spacecraft is at an orbital altitude above low-earth orbits.

15. A method as claimed in claim 1, wherein the jet means comprises a nozzle.

16. A method as claimed in claim 1, wherein the oxidizing agent comprises hydrogen peroxide.

17. A method for cleaning a surface, wherein a photocatalytic coating is deposited on the surface, wherein the photocatalytic coating comprises a compound selected from the group consisting of:
   (A) titanium dioxide;
   (B) titanium dioxide doped with a metal selected from the group consisting of copper and silver; and
   (C) a titanate having a formula Me—$TiO_3$, wherein Me is a metal selected from the group consisting of barium, strontium, and lead;
   wherein the surface is an external surface of a spacecraft in space; and wherein after the external surface of the spacecraft is contaminated with polymerized hydrocarbon or a silicone film, the method comprises the steps of:
(a) providing on the spacecraft a source of an oxidizing agent, wherein the oxidizing agent comprises hydrogen peroxide or $O_2$;
(b) releasing a stream of the oxidizing agent through a jet means to produce a jet of the oxidizing agent; and
(c) directing the jet of the oxidizing agent onto the external surface of the spacecraft in space to oxidize the photocatalytic coating.

18. The method as claimed in claim 17, wherein said coating has a thickness when applied to said surface, wherein the thickness is within a range of between 5 Angstroms and $2 \times 10^4$ Angstroms.

19. The method as claimed in claim 18, wherein said surface comprises one or more thermal radiators, solar panels, solar concentrators, and/or imaging optics, said imaging optics further comprising cryogenic infra-red optics, visible-light optics, and/or ultra-violet optics.

20. The method as claimed in claim 18, wherein said coating is deposited onto said surface by reactive sputtering of metal constituents in the presence of oxygen.

21. The method as claimed in claim 18, wherein said coating is deposited onto said surface by radio frequency sputtering of stoichiometric targets.

22. The method as claimed in claim 18, wherein said coating is applied to said surface by electron beam evaporation.

23. The method as claimed in claim 18, wherein said coating is deposited onto said surface by sol-gel processing.

24. A method as claimed in claim 18, wherein the oxidizing agent is $O_2$.

25. The method as claimed in claim 17, wherein said coating has a thickness when applied to said surface; wherein the thickness is within a range of between 5 Angstroms and $2 \times 10^4$ Angstroms; and wherein said surface is cleaned by a combined action of said photocatalytic coating and said oxidizing agent while said spacecraft is in orbit.

26. The method as claimed in claim 25, wherein said releasing of the oxidizing agent is by a method of periodic dispensing.

27. The method as claimed in claim 26, wherein said periodic dispensing is accomplished by using a dispensing system, wherein the dispensing system comprises the source of the oxidizing agent, a valve, and the jet means to shape a plume of said oxidizing agent.

28. The method as claimed in claim 26, wherein said periodic dispensing is accomplished by using a dispensing system.

29. The method as claimed in claim 25, wherein said releasing of said oxidizing agent is by a method of continuous leaking.

30. The method as claimed in claim 29, wherein said continuous leaking is accomplished by a dispensing system.

31. A method as claimed in claim 17, wherein the oxidizing agent is $O_2$.

32. A method as claimed in claim 17, wherein the spacecraft is at an orbital altitude above low-earth orbits.

33. A method as claimed in claim 17, wherein the jet means comprises a nozzle.

34. A method as claimed in claim 17, wherein the oxidizing agent comprises hydrogen peroxide.

35. A method for preventing an excessive accumulation of polymerized hydrocarbon and/or a silicone film on a surface of a spacecraft, the method comprising the steps of:
(a) depositing onto said surface a photocatalytic coating made of a compound selected from the group consisting of:
(A) titanium dioxide;
(B) titanium dioxide doped with a metal selected from the group consisting of copper and silver; and
(C) a titanate having a formula Me—$TiO_3$, wherein Me is a metal selected from the group consisting of barium, strontium, and lead; and
(b) oxidizing the photocatalytic coating by exposing said surface to an oxidizing agent, wherein the oxidizing agent is hydrogen peroxide.

36. A method as claimed in claim 35, wherein said coating has a thickness when applied to said surface; wherein the thickness is within a range of between 5 Angstroms and $2 \times 10^4$ Angstroms; and wherein said surface is cleaned by a combined action of said photocatalytic coating and said oxidizing agent while said spacecraft is in orbit.

37. A method as claimed in claim 35, wherein said coating has a thickness when applied to said surface, wherein the thickness is within a range of between 5 Angstroms and $2 \times 10^4$ Angstroms.

38. A method for cleaning a surface following contamination of said surface with polymerized hydrocarbon or a silicone film, the method comprising the steps of:
(a) depositing onto said surface a photocatalytic coating made of a compound selected from the group consisting of:
(A) titanium dioxide;
(B) titanium dioxide doped with a metal selected from the group consisting of copper and silver; and
(C) a titanate having a formula Me—$TiO_3$, wherein Me is a metal selected from the group consisting of barium, strontium, and lead; and
(b) oxidizing the photocatalytic coating by exposing said surface to an oxidizing agent, wherein the oxidizing agent is hydrogen peroxide.

39. A method as claimed in claim 38, wherein said coating has a thickness when applied to said surface; wherein the thickness is within a range of between 5 Angstroms and $2 \times 10^4$ Angstroms; and wherein said surface is on a spacecraft and is cleaned by a combined action of said photocatalytic coating and said oxidizing agent while said spacecraft is in orbit.

40. A method as claimed in claim 38, wherein said coating has a thickness when applied to said surface, wherein the thickness is within a range of between 5 Angstroms and $2 \times 10^4$ Angstroms.

41. A method for preventing an excessive accumulation of polymerized hydrocarbon and/or a silicone film on a surface, wherein a photocatalytic coating is deposited on the surface, wherein the photocatalytic coating comprises a compound selected from the group consisting of:
(A) titanium dioxide;
(B) titanium dioxide doped with a metal selected from the group consisting of copper and silver; and
(C) a titanate having a formula Me—$TiO_3$, wherein Me is a metal selected from the group consisting of barium, strontium, and lead;
wherein the method comprises:
oxidizing the photocatalytic coating by exposing said surface to hydrogen peroxide.

42. A method as claimed in claim 41, wherein the surface is an external surface of a spacecraft; and wherein the surface is cleaned by a combined action of the photocatalytic coating and the oxidizing agent while the spacecraft is in space.

43. A method as claimed in claim 41, wherein the surface is an external surface of a spacecraft; and wherein the spacecraft is at an orbital altitude above low-earth orbits.

44. A method for cleaning a surface, wherein a photocatalytic coating is deposited on the surface, wherein the photocatalytic coating comprises a compound selected from the group consisting of:

(A) titanium dioxide;

(B) titanium dioxide doped with a metal selected from the group consisting of copper and silver; and (C) a titanate having a formula $Me-TiO_3$, wherein Me is a metal selected from the group consisting of barium, strontium, and lead;

wherein after the surface is contaminated with polymerized hydrocarbon or a silicone film, the method comprises:

oxidizing the photocatalytic coating by exposing said surface to hydrogen peroxide.

45. A method as claimed in claim 44, wherein the surface is an external surface of a spacecraft; and wherein the surface is cleaned by a combined action of the photocatalytic coating and the oxidizing agent while the spacecraft is in space.

46. A method as claimed in claim 44, wherein the surface is an external surface of a spacecraft; and wherein the spacecraft is at an orbital altitude above low-earth orbits.

47. A method as claimed in claim 25, wherein the oxidizing agent is $O_2$.

* * * * *